R. C. WOODS.
PITTING TOOL.
APPLICATION FILED SEPT. 6, 1921.

1,438,418. Patented Dec. 12, 1922.

INVENTOR.
RALPH C. WOODS
BY E E Sauze
ATTORNEYS.

Patented Dec. 12, 1922.

1,438,418

UNITED STATES PATENT OFFICE.

RALPH C. WOODS, OF WALLA WALLA, WASHINGTON.

PITTING TOOL.

Application filed September 6, 1921. Serial No. 498,798.

*To all whom it may concern:*

Be it known that I, RALPH C. WOODS, a citizen of the United States, residing at Walla Walla, in the county of Walla Walla and State of Washington, have invented certain new and useful Improvements in Pitting Tools, of which the following is a specification.

This invention relates to pitting tools and more particularly to tools used for removing the kernels of small fruits, such as cherries, grapes, and the like.

One of the objects of this invention is to provide a means for extracting kernels which will leave the fruit relatively free from mutilation.

Another object of the invention is to provide a means for extracting kernels which is hand operated and which may be operated with great rapidity.

A further object of the invention is to provide a means for extracting kernels that is highly efficient and yet so small in size and light in weight that it can be sent through the mails with a minimum of postage.

A further object of the invention is to provide a means for extracting kernels that may be manufactured by stamping and from a single piece of material and hence may be produced exceedingly cheap.

With these and other objects in view reference is now had to the accompanying drawings in which—

Figure 1:
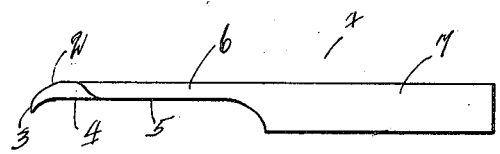
Figure 2:
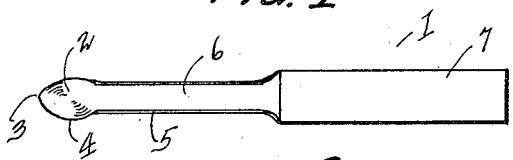
Figures 3, 4:
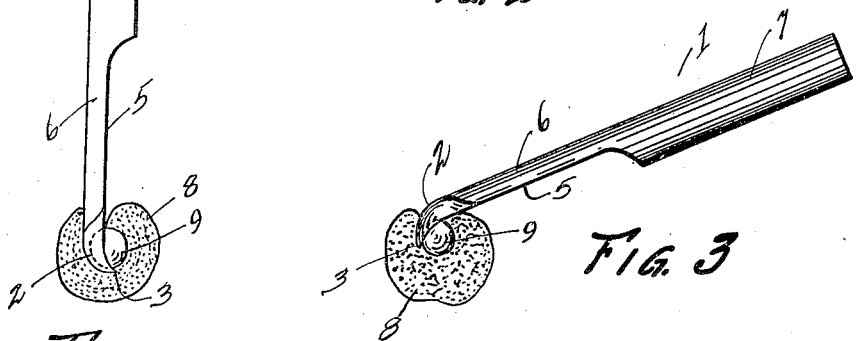
Figure 5:
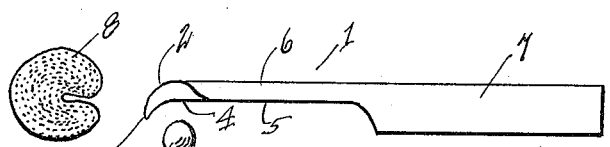

Fig. 1 is a side view of the tool;
Fig. 2 is a plan view thereof;
Fig. 3 is a side elevation of the tool in the entering position;
Fig. 4 is a side elevation of the tool in the withdrawing position; and
Fig. 5 shows the relative position of the fruit, kernel, and tool as the operation is completed.

Having reference to the drawings like numerals refer to like parts throughout and the numeral 1 refers to the tool which consists of a spoon, a shank, and a handle, which will now be described.

The spoon consists of a bowl 2 which is extended to form a beak 3, the beak being curved and pointed to resemble a parrot's beak.

Around the top of the bowl is the rim 4 which continues in the same plane and in the same general line with the edge 5 of the shank 6, and the beak curves away from this plane a distance sufficient to pass the center of the kernel when the tool is in the withdrawing position, in other words, when the kernel is seated in the bowl of the spoon.

The shank 6 is preferably curved to correspond to the curvature of the bowl, the curved form giving strength to the shank, however other forms may be adopted if desired, with the shank rigidly attached to the spoon, or preferably made a unit with it and from the same piece of material. The shank 6 terminates in a handle 7 which is also preferably curved, for strength and simplicity of manufacture, and may also be formed from the same piece of material and a unit with it or the handle may be separate and attached to the spoon and shank in any suitable manner.

In use the fruit 8 is held in one hand while the tool is held in the other; the beak is now directed to the depression in the fruit from whence the stem has been removed, this point obviously being nearest the kernel, and also as the skin has been broken here by the removal of the stem. This permits an easy entrance of the tool, and a neat extraction of the kernel 9 without an undue mutilation of the fruit which would otherwise occur were entrance made at any other point.

The beak is forced into the fruit and the handle is manipulated with a circular motion to cause the beak to pass about the kernel following its curvature, finally coming to rest in the position shown in Fig. 4 with the kernel seated in the spoon and the point of the beak positioned behind and slightly past the center of the kernel.

As soon as the tool reaches this position it is withdrawn without the curved motion, or in other words in a straight line, and the kernel is removed, the space left by the kernel closing together as shown in Fig. 5; as soon as the kernel is removed it immediately drops from the tool.

Having thus described my invention, I claim—

1. In a pitting tool, the combination of a spoon and handle, with said spoon consisting of a bowl, having an edge, and a pointed beak, said beak departing from the line of the edge to bring the point of the beak past the center of the kernel when the kernel rests in said spoon, and a handle attached to said spoon.

2. In a pitting tool, the combination of a spoon, a shank and a handle, said spoon comprised of a bowl, having an edge, and a beak, and designed with said edge in the same plane with said shank, and with the beak departing from the plane in a curve, a shank, a handle, and said spoon, shank and handle comprised of one piece of material.

3. In a pitting tool, the combination of a spoon, a shank and a handle, said spoon terminating in a pointed beak, said beak curved away from the bowl, to bring the point of the beak past the center of the kernel when the kernel rests in the spoon, a shank extending from said spoon and having the same general curvature as said spoon, and said shank terminating in a handle.

In testimony whereof I affix my signature.

RALPH C. WOODS.